(12) United States Patent
Kim (10) Patent No.: US 8,244,050 B2
(45) Date of Patent: Aug. 14, 2012

(54) METHODS AND APPARATUSES FOR ENCODING AND DECODING IMAGE BY USING IMPROVED COMPRESSION RATIO OF ENCODING INFORMATION

(75) Inventor: Nak-hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 889 days.

(21) Appl. No.: 12/201,344

(22) Filed: Aug. 29, 2008

(65) Prior Publication Data
US 2010/0054616 A1 Mar. 4, 2010

(30) Foreign Application Priority Data
Jan. 2, 2008 (KR) .................. 10-2008-0000158

(51) Int. Cl.
G06K 9/36 (2006.01)
G06K 9/46 (2006.01)
(52) U.S. Cl. .................. 382/238; 382/232; 382/233
(58) Field of Classification Search .................. None
See application file for complete search history.

(56) References Cited

U.S. PATENT DOCUMENTS
2004/0126027 A1 7/2004 Park et al.
2005/0157797 A1* 7/2005 Gaedke .................. 375/240.24
2007/0121731 A1* 5/2007 Tanizawa et al. .......... 375/240.24
2009/0110067 A1* 4/2009 Sekiguchi et al. ....... 375/240.12
2009/0175334 A1* 7/2009 Ye et al. .................... 375/240.12

FOREIGN PATENT DOCUMENTS
JP 2007-67469 A 3/2007
KR 10-2004-0061245 A 7/2004

OTHER PUBLICATIONS

"Advanced video coding for generic audiovisual services." Telecommunication Standardization Section of ITU, May 2003.

* cited by examiner

Primary Examiner — Li Liu
(74) Attorney, Agent, or Firm — Sughrue Mion, PLLC

(57) ABSTRACT

Provided are methods and apparatuses for encoding and decoding an image. The method of encoding the image includes calculating the number of times that encoding information of each of a plurality of sub-blocks included in a current block is exactly predicted, determining whether or not to predictably encode the encoding information of each sub-block, based on the calculated number of times, and predictably encoding the encoding information of each sub-block according to the determination. Using the method can prevent the case in which many bits are required to encode the encoding information due to inexact prediction about the encoding information, thereby decreasing the compression ratio of the image encoding process, and can compress the image with a higher efficiency.

29 Claims, 8 Drawing Sheets

FIG. 1 (RELATED ART)

0 (VERTICAL)

1 (HORIZONTAL)

2 (DC)

3 (PLANE)

|  | ENCODING | NUMBER OF BITS |
|---|---|---|
| P = min(A,L) | 1 | 1 |
| P! = min(A,L) | 0 XXX | 4 |

|  | 542 | 544 | 546 | 548 |
|---|---|---|---|---|
| 552 | 502 | 504 | 506 | 508 |
| 554 | 510 | 512 | 514 | 516 |
| 556 | 518 | 520 | 522 | 524 |
| 558 | 526 | 528 | 530 | 532 |

```
Mb_mode(){
    pred_mode_coding_method
    if (pred_mode_coding_method==0){/*Predictive coding*/
        for(n=0; n<NUMBER_OF_SUB_BLOCK; n++)
            prev_block_mode_flag[n]
            if(!prev_block_mod_flag[n])
                rem_block_mode[n]
        }
    }
    else{/*Raw coding*/
        for(n=0; n<NUMBER_OF_SUB_BLOCK; n++)
            block_mode[n]
    }
}
```

FIG. 6B

```
mb_pred( mb_type ) {
  if( MbPartPredMode( mb_type, 0 ) = = Intra_4x4 | | MbPartPredMode( mb_type, 0 )
  = = Intra_8x8 | | MbPartPredMode( mb_type, 0 ) = = Intra_16x16 ) {
    if( MbPartPredMode( mb_type, 0 ) ! = Intra_16x16)
      pred_mode_coding_method
    if( pred_mode_coding_method = = 0 ) {  /* Predictive coding */
      if( MbPartPredMode( mb_type, 0 ) = = Intra_4x4 )
        for( n=0; n<16; n++ ) {
          prev_intra4x4_pred_mode_flag[ n ]
          if( !prev_intra4x4_pred_mode_flag[ n ] )
            rem_intra4x4_pred_mode[ n ]
        }
      if( MbPartPredMode( mb_type, 0 ) = = Intra_8x8 )
        for( n=0; n<4; n++ ) {
          prev_intra8x8_pred_mode_flag[ n ]
          if( !prev_intra8x8_pred_mode_flag[ n ] )
            rem_intra8x8_pred_mode[ n ]
        }
    }
    else {  /* Raw coding */
      if( MbPartPredMode( mb_type, 0 ) = = Intra_4x4 )
        for( n=0; n<16; n++ )
          intra4x4_pred_mode[ n ]
      if( MbPartPredMode( mb_type, 0 ) = = Intra_8x8 )
        for( n=0; n<4; n++ )
          intra8x8_pred_mode[ n ]
    } ...
```

FIG. 7

| INTRA-PREDICTION MODE | VLC CODEWORD |
|---|---|
| 0 | 000 |
| 1 | 001 |
| 2 | 010 |
| 3 | 011 |
| 4 | 100 |
| 5 | 101 |
| 6 | 110 |
| 7 | 1110 |
| 8 | 1111 |

METHODS AND APPARATUSES FOR ENCODING AND DECODING IMAGE BY USING IMPROVED COMPRESSION RATIO OF ENCODING INFORMATION

CROSS-REFERENCE TO RELATED PATENT APPLICATION

This application claims the benefit of Korean Patent Application No. 10-2008-0000158, filed on Jan. 2, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding an image, and more particularly, to encoding and decoding an image by more efficiently compressing encoding information of sub-blocks included in a current block.

2. Description of the Related Art

In image compression methods such as Moving Picture Experts Group-1 (MPEG-1), MPEG-2, MPEG-4, and H.264/MPEG-4 Advanced Video Coding (AVC), a picture is divided into macroblocks so as to encode an image. An optimum encoding mode is selected in consideration of a data size and a data distortion with respect to the macroblocks, and the macroblocks are encoded with the selected optimum encoding mode.

In order to encode macroblocks of a current picture, intra-prediction from among encoding methods does not use a reference picture but uses pixel values which are spatially adjacent to a current block to be encoded. First, a prediction block with respect to the current block is generated by using the adjacent pixel values. Then, the prediction block is subtracted from the current block so that a residual block is generated therefrom, and the generated residual block is encoded. According to the H.264 standard, one mode from among a total of 22 intra-prediction modes is used in order to predictably encode the current block.

Figure 1:
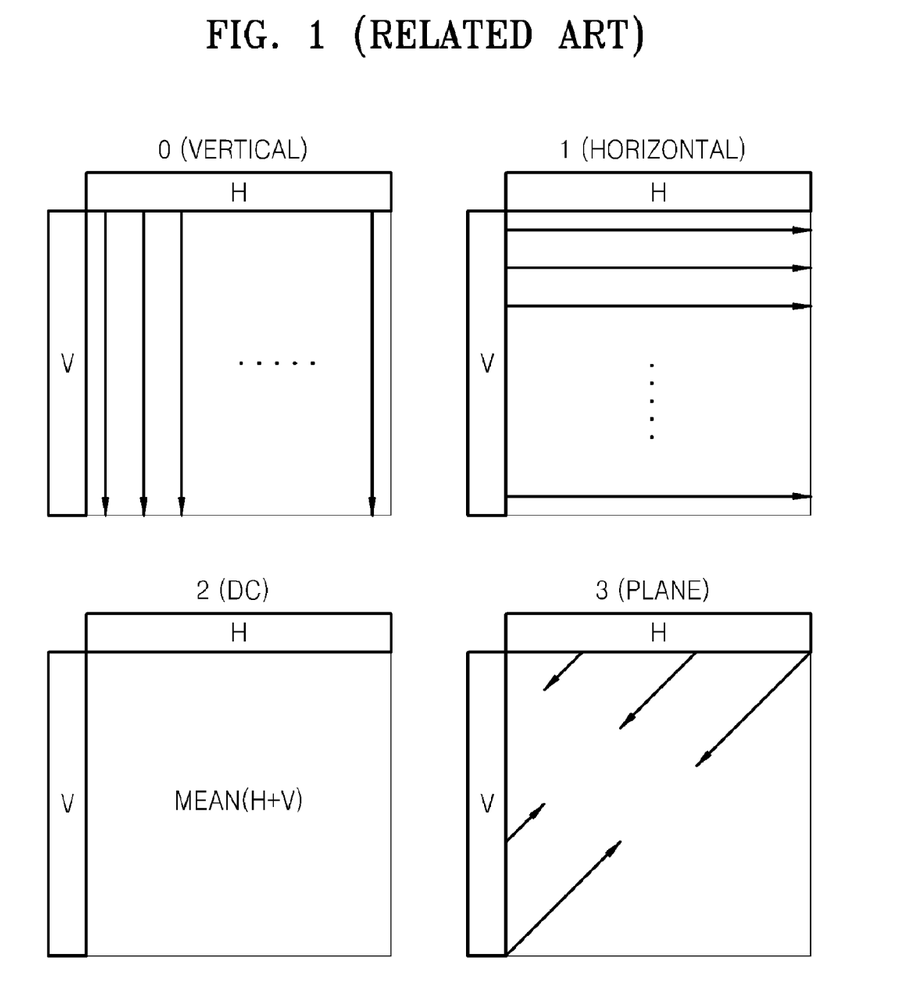
FIG. 1 is a set of diagrams of a conventional 16×16 intra-prediction mode.

FIG. 1 is a set of diagrams of a conventional 16×16 intra-prediction mode.

Referring to FIG. 1, there are a total of four conventional 16×16 intra-prediction modes, including a vertical mode, a horizontal mode, a direct current (DC) mode, and a plane mode.

Figure 2:
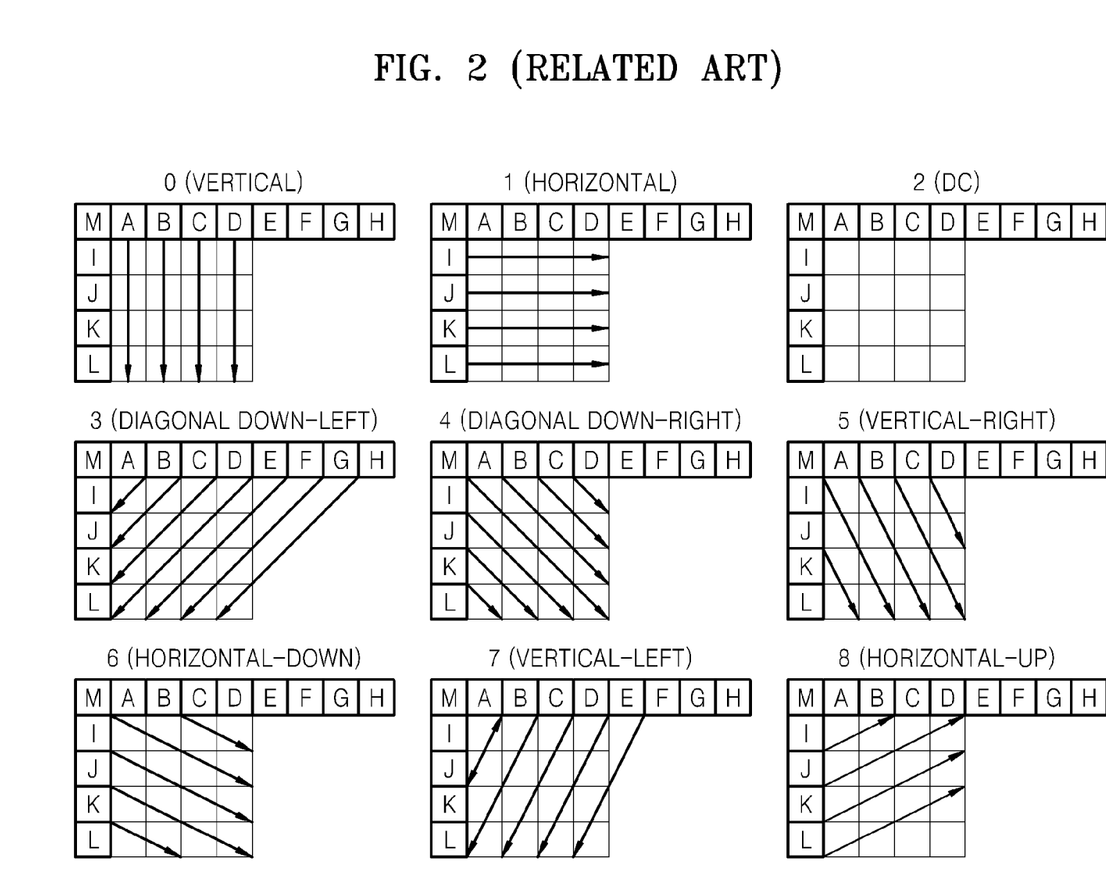
FIG. 2 is a set of diagrams of a conventional 4×4 intra-prediction mode.

FIG. 2 is a set of diagrams of a conventional 4×4 intra-prediction mode.

Referring to FIG. 2, there are a total of nine conventional 4×4 intra-prediction modes, including a vertical mode, a horizontal mode, a DC mode, a diagonal down-left mode, a diagonal down-right mode, a vertical-right mode, a horizontal down mode, a vertical-left mode, and a horizontal-up mode.

In addition to the 4×4 intra-prediction modes and the 16×16 intra-prediction modes, there is an 8×8 intra-prediction mode in which intra-prediction is performed in 8×8 block units.

Intra-prediction mode numbers, which are indexed in each of the nine 4×4 intra-prediction modes, are determined according to a frequency of use with respect to each of the nine modes. In terms of probability, the vertical mode, that is a #0 mode, is a most frequently used mode when the intra-prediction is performed with respect to a target block, and the horizontal-up mode, that is a #8 mode, is a least frequently used mode.

In order to decode a current block that has been predictably encoded by using intra-prediction, a receiver receiving data about the current block must have information about the intra-prediction mode of the current block. For this, when the intra-prediction encoding is performed, the information about the intra-prediction mode is inserted into a bitstream and transmitted to the receiver. Even when the information about the intra-prediction mode is inserted into the bitstream, prediction encoding is performed in order to reduce the number of bits. Hereinafter, a case in which an intra-prediction direction is encoded according to the H.264 standard will be described.

Figure 3A:
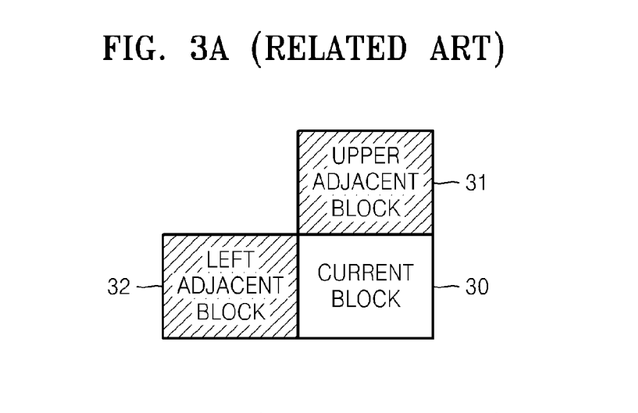
FIGS. 3A and 3B are diagrams for describing a conventional method of predictably encoding an intra-prediction mode.
Figure 3B:
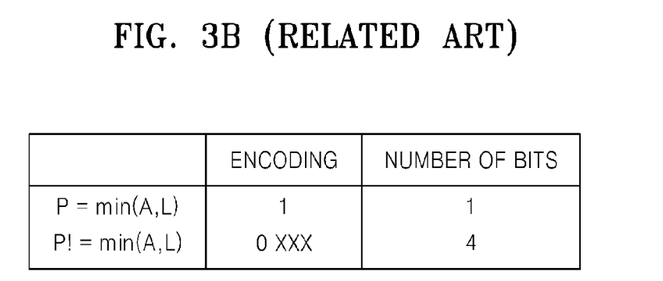

FIGS. 3A and 3B are diagrams for describing a conventional method of predictably encoding an intra-prediction mode. Here, a number of an intra-prediction mode of a current block 30 having a 4×4-size is referred to as P, a number of an intra-prediction mode of an upper adjacent block 31 is referred to as A, and a number of an intra-prediction mode of a left adjacent block 32 is referred to as L.

In image intra-prediction encoding according to the H.264 standard, information about the intra-prediction direction of the current block 30 is encoded by referring to the intra-prediction modes of the upper adjacent block 31 and the left adjacent block 32. The upper adjacent block 31 and the left adjacent block 32 are adjacent blocks in which encoding has been completed before the current block 30. The number of the intra-prediction modes of the upper adjacent block 31 and the left adjacent block 32, respectively, indicates the intra-prediction direction.

First, the number of the intra-prediction mode of the current block 30 is compared with a minimum value from among the number of the intra-prediction mode of the upper adjacent block 31 and the number of the intra-prediction mode of the left adjacent block 32. The minimum value from among the numbers is a prediction value for the number of the intra-prediction mode of the current block 30.

When the minimum value, that is, the prediction value is equal to the number of the intra-prediction mode of the current block 30, the intra-prediction mode is encoded with 1 and is inserted into a bitstream. A receiver receiving the bitstream refers to the number of the intra-prediction mode of the upper adjacent block 31 and the number of the intra-prediction mode of the left adjacent block 32, and determines the minimum value from among the numbers to be the number of the intra-prediction mode of the current block 30, thereby performing decoding according to the intra-prediction direction thereof. As described above, the intra-prediction mode numbers are determined according to the frequency of use with respect to each mode, and there is a high probability that the current block 30 may have a prediction direction similar to the upper and left adjacent blocks 31 and 32. Thus, there is a high probability that the minimum value from among the numbers of the intra-prediction modes of the upper and left adjacent blocks 31 and 32 is equal to the number of the intra-prediction mode of the current block 30. Therefore, there is also a high probability that information about the intra-prediction mode of the current block 30 may be indicated by using one bit, such that compression of the information is performed.

When the minimum value does not equal the number of the intra-prediction mode of the current block 30, 0 is inserted into the bitstream in order to indicate this inequality. Since the minimum value is not equal to the number of the intra-prediction mode of the current block 30, the number of the intra-prediction mode of the current block 30 cannot be determined via the upper and left adjacent blocks 31 and 32. Thus, information about the intra-prediction mode is inserted into the bitstream, in the form of 'XXX', that is, a size of three bits.

Since there are nine intra-prediction modes, numbered from 0 to 8, and the minimum value is not the number of the intra-prediction mode of the current block 30, thus, eight numbers excluding the minimum value are indicated by using the three bits. To be more specific, when the number of the intra-prediction mode of the current block 30 is less than the minimum value from among the numbers of the intra-prediction modes of the upper and left adjacent blocks 31 and 32, a binary number representing the number of the intra-prediction mode of the current block 30 becomes a 'XXX' value. However, when the number of the intra-prediction mode of the current block 30 is greater than the minimum value, a value obtained by subtracting 1 from the binary number for the number of the intra-prediction mode of the current block 30 becomes the 'XXX' value.

According to the conventional methods, information about the intra-prediction direction of the current block 30 is compressed only when the minimum value from among the numbers of the intra-prediction modes of the upper and left adjacent blocks 31 and 32 is equal to the number of the intra-prediction mode of the current block 30. However, when the number of the intra-prediction mode of the current block 30 is not equal to the minimum value, the information about the intra-prediction direction is indicated by using a total of four bits.

For example, in the case where the current block 30 of FIG. 3A is assumed to use an intra-prediction mode of 1, the upper adjacent block 31 is assumed to use an intra-prediction mode of 0, and the left adjacent block 32 is assumed to use an intra-prediction mode of 2, since the minimum value of the numbers of the intra-prediction modes is 0, the minimum value is not equal to the number of the intra-prediction mode of the current block 30. Thus, the information about the intra-prediction direction has to be indicated by using four bits. In the case where all numbers of intra-prediction modes of all blocks having a 4×4-size included in a macroblock are not equal to a prediction value, a total of 64 bits are required to encode the intra-prediction modes. Thus, inefficiency is caused, since the number of bits necessary for encoding the information about the intra-prediction modes is increased, even though the prediction encoding has been performed.

Such inefficiency has been described with reference to intra-prediction, but inefficiency incurred by performing prediction encoding may be caused whenever different encoding information is predictably encoded. Thus, methods and apparatuses for encoding and decoding an image are required, wherein the methods and apparatuses can more efficiently encode the intra-prediction mode, that is, encoding information.

SUMMARY OF THE INVENTION

The present invention provides methods and apparatuses for encoding and decoding an image by more efficiently compressing encoding information such as an intra-prediction mode.

The present invention also provides a computer readable recording medium having recorded thereon a program for executing the methods.

According to an aspect of the present invention, there is provided a method of encoding an image, the method including the operations of calculating the number of times that encoding information of each of a plurality of sub-blocks included in a current block is exactly predicted; determining whether or not to predictably encode the encoding information of each sub-block, based on the calculated number of times; and selectively performing prediction encoding according to the determination, and encoding the encoding information of each sub-block, wherein the encoding information is about an encoding method used to encode a pixel value of each sub-block.

When the calculated number of times is greater than a predetermined number, the operation of performing the prediction encoding may include the operation of predictably encoding the intra-prediction mode of each sub-block, based on intra-prediction modes of adjacent blocks that are respectively adjacent to each sub-block.

When the calculated number of times is less than or equal to the predetermined number, the operation of performing the prediction encoding may include the operation of not predictably encoding the intra-prediction mode of each sub-block but directly encoding the intra-prediction mode of each sub-block according to variable length coding.

According to another aspect of the present invention, there is provided a method of decoding an image, the method including the operations of receiving a bitstream comprising data about a current block, extracting flag information from the received bitstream, and decoding the flag information indicating whether encoding information of each of a plurality of sub-blocks included in the current block is predictably encoded; and referring to the extracted flag information, selectively performing prediction decoding, and decoding the encoding information of each sub-block, wherein the encoding information is about an encoding method used to encode a pixel value of each sub-block.

The operation of decoding the encoding information may include the operations of referring to the flag information, and determining whether an intra-prediction mode of each sub-block has been predictably encoded; and selectively performing the prediction decoding according to the determination, and decoding the intra-prediction mode of each sub-block.

The operation of decoding the intra-prediction mode may include the operation of predictably decoding the intra-prediction mode of each sub-block based on intra-prediction modes of adjacent blocks which are respectively adjacent to each sub-block when the intra-prediction mode of each sub-block has been predictably encoded.

The operation of decoding the intra-prediction mode may include the operation of directly decoding the intra-prediction mode of each sub-block which has been encoded to the bitstream according to variable length coding or context-adaptive variable arithmetic coding (CABAC) when the intra-prediction mode of each sub-block has not been predictably encoded.

According to another aspect of the present invention, there is provided an image encoding apparatus, the image encoding apparatus including a control unit calculating the number of times that encoding information of each of a plurality of sub-blocks included in a current block is exactly predicted, and determining whether or not to predictably encode the encoding information of each sub-block, based on the calculated number of times; and an information encoding unit selectively performing prediction encoding according to the determination, and encoding the encoding information of each sub-block, wherein the encoding information is about an encoding method used to encode a pixel value of each sub-block.

According to another aspect of the present invention, there is provided an image decoding apparatus, the image decoding apparatus including a flag decoding unit receiving a bitstream comprising data about a current block, extracting flag information from the received bitstream, and decoding the flag information indicating whether encoding information of each of a plurality of sub-blocks included in the current block is predictably encoded; and an information decoding unit referring to the extracted flag information, selectively performing prediction decoding, and decoding the encoding information of each sub-block, wherein the encoding information is about an encoding method used to encode a pixel value of each sub-block.

According to another aspect of the present invention, there is provided a computer readable recording medium having recorded thereon a program for executing the methods of encoding and decoding the image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 4:
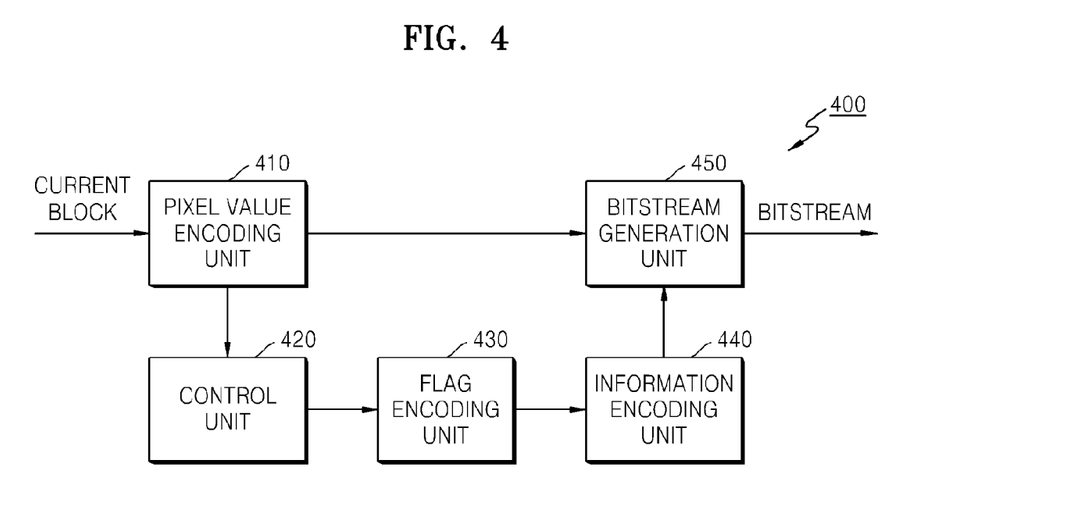
FIG. 4 is a block diagram of an apparatus for encoding an image, according to an exemplary embodiment of the present invention.

FIG. 4 is a block diagram of an apparatus for encoding an image, according to an embodiment of the present invention.

Referring to FIG. 4, the apparatus for encoding the image (hereinafter, referred to as 'an image encoding apparatus 400') according to the current embodiment of the present invention includes a pixel value encoding unit 410, a control unit 420, a flag encoding unit 430, an information encoding unit 440, and a bitstream generation unit 450. Hereinafter, in the detailed description of the present invention, information about an encoding method used to encode a pixel value, that is, encoding information is described with reference to information about an intra-prediction mode. However, it will be easily understood by those of ordinary skill in the art that methods of encoding and decoding the encoding information according to the present invention may be applied to all encoding information which may be encoded by using prediction encoding.

The pixel value encoding unit 410 receives a current block and encodes pixel values of the current block. The pixel value encoding unit 410 generates a prediction block of the current block by using inter-prediction or intra-prediction, and generates a residual block by subtracting the generated prediction block from the current block.

The pixel value encoding unit 410 performs a discrete cosine transform (DCT) on the generated residual block, generates DCT coefficients, quantizes the generated DCT coefficients, and performs entropy coding, thereby generating data about the pixel values of the current block.

The control unit 420 calculates the number of times that encoding information about each of a plurality of sub-blocks included in the current block is exactly predicted, and determines whether or not to predictably encode the encoding information about each of the sub-blocks, based on the calculated the number of times. Hereinafter, an intra-prediction mode will be described as the encoding information.

Figure 5:
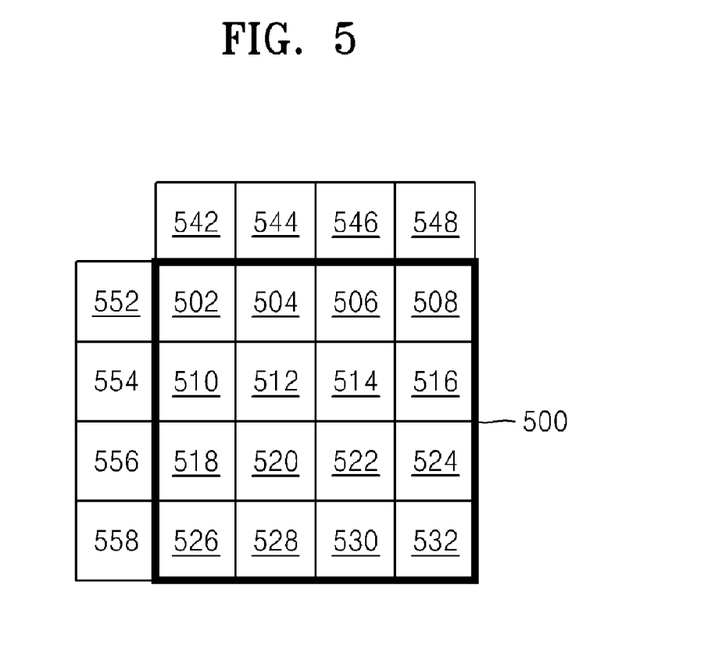
FIG. 5 is a diagram for describing a method of determining whether or not to predictably encode encoding information, according to an exemplary embodiment of the present invention.

FIG. 5 is a diagram for describing a method of determining whether or not to predictably encode encoding information according to an embodiment of the present invention. FIG. 5 corresponds to a case in which intra-prediction modes of sub-blocks 502 through 532 included in a current block 500 are encoded. Here, the current block 500 may be a macroblock having a 16×16-size, and each of the sub-blocks 502 through 532 may be a block having a 4×4-size. Although not illustrated in FIG. 5, it will be easily understood by those of ordinary skill in the art that the methods of encoding and decoding the encoding information according to the present invention may be applied to a case in which the sub-block has an 8×8-size.

Referring to FIG. 5, the intra-prediction mode of the sub-block 502 is predicted from intra-prediction modes of adjacent blocks 542 and 552. Similarly, the intra-prediction mode of the sub-block 504 is predicted from the intra-prediction modes of adjacent blocks 544 and 502, and the intra-prediction modes of the remaining sub-blocks 506 through 532 included in the current block 500 are respectively predicted from the intra-prediction modes of blocks that are upwardly and leftward adjacent to each corresponding sub-block.

The predicted intra-prediction mode may be different from an intra-prediction mode that is actually used when the pixel value encoding unit 410 encodes the sub-block 502. For example, as previously described with reference to FIGS. 3A and 3B, in the case where a number of the actual intra-prediction mode of the sub-block 502 is 1, where a number of the intra-prediction mode of the upper adjacent block 542 is 0, and where a number of the intra-prediction mode of the left adjacent block 552 is 2, the intra-prediction mode predicted from the intra-prediction modes of the adjacent blocks 542 and 552 is 0 which is not equal to the number of the actual intra-prediction mode of the sub-block 502.

Thus, the control unit 420 calculates the number of times that the intra-prediction mode of each of the sub-blocks 502 through 532 included in the current block 500 is exactly predicted. The control unit 420 calculates the number of times that the intra-prediction mode used to perform intra-prediction encoding on each of the sub-blocks 502 through 532 is equal to the intra-prediction mode predicted from the intra-prediction modes of the blocks which are respectively adjacent to each of the sub-blocks 502 through 532.

Only when the number of times is greater than a predetermined number, does the control unit 420 determine that the intra-prediction modes of the sub-blocks 502 through 532 are predictably encoded by using the method described with reference to FIGS. 3A and 3B. When the number of times is less than the predetermined number, the control unit 420 determines that the intra-prediction modes are not encoded by using prediction encoding but encoded by using another method. For example, the control unit 420 may determine that the intra-prediction modes of the sub-blocks 502 through 532 are predictably encoded only when the number of times is greater than 4, and may decide that the intra-prediction modes are not encoded by using the prediction encoding but encoded by using another method when the number of times is less than or equal to 4.

Referring back to FIG. 4, the flag encoding unit 430 encodes flag information according to the determination of the control unit 420. The flag encoding unit 430 encodes the flag information by which two cases are differentiated, wherein the first case is a case in which the control unit 420 determines to encode the encoding information by using the prediction encoding, and the second case is a case in which the control unit 420 determines to encode the encoding information not by using the prediction encoding but by using another method. For example, in the case where the control unit 420 determines to encode the intra-prediction mode by using the prediction encoding, a flag indicating the prediction encoding is set as 0. In the case where the control unit 420 determines to directly encode the intra-prediction mode, without using the prediction encoding, the flag is set as 1. This will now be described in detail with reference to FIGS. 6A and 6B.

Figure 6A:
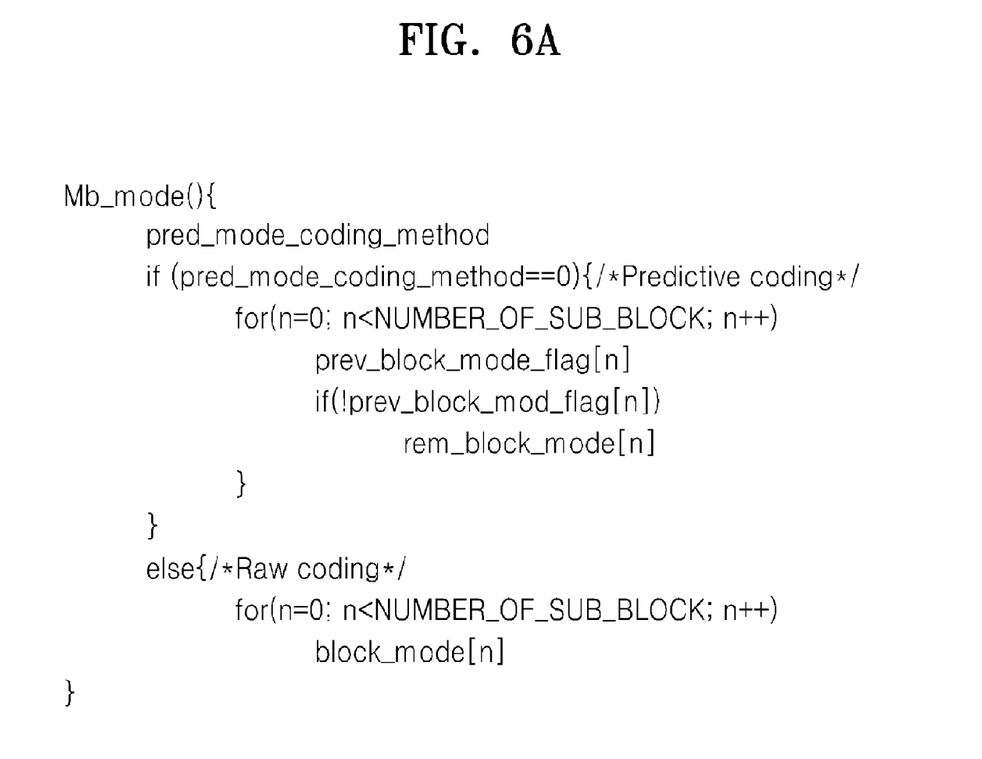
FIGS. 6A and 6B respectively show syntax for encoding an intra-prediction mode according to another exemplary embodiment of the present invention.
Figure 6B:
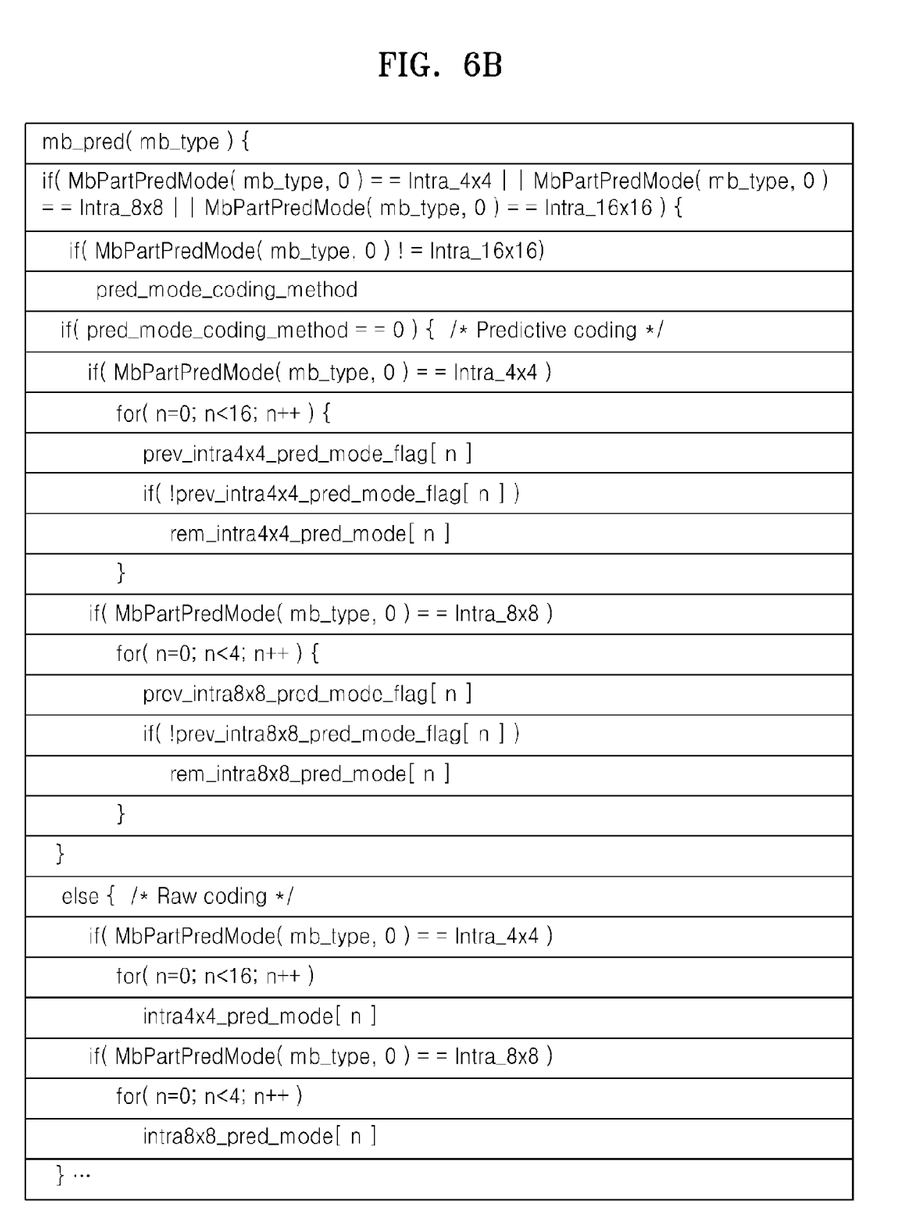

FIGS. 6A and 6B respectively show syntax for encoding an intra-prediction mode according to another embodiment of the present invention.

Referring to FIG. 6A, "pred_mode_coding_method" flag information, which indicates whether encoding information of sub-blocks has been predictably encoded, is first encoded.

In the case where the control unit 420 determines to predictably encode the encoding information, the "pred_mode_coding_method" flag is set as 0. Otherwise, in the case where the control unit 420 determines to directly encode the encoding information not by using prediction encoding but by using another method, the "pred_mode_coding_method" flag is set as 1.

When the "pred_mode_coding_method" flag is 0, the encoding information is predictably encoded. First, "prev_block_mode_flag[n]", which indicates whether the encoding information has been exactly predicted, is encoded. After that, in the case where the "prev_block_mode_flag[n]" flag is 0, that is, in the case where the predicted encoding information is different from actual encoding information, the encoding information is encoded by using "rem_block_mode[n]" syntax.

When the "pred_mode_coding_method" flag is 1, the encoding information is directly encoded not by using the prediction encoding but by using another method. "block_mode[n]" is syntax for directly encoding the encoding information.

Referring to FIG. 6B, in order to encode intra-prediction modes of sub-blocks having a 4×4-size or an 8×8 size, "pred_mode_coding_method" flag information indicating whether the intra-prediction mode has been predictably encoded is first encoded.

In the case where the control unit 420 determines to predictably encode the intra-prediction mode, the "pred_mode_coding_method" flag is set as 0. Otherwise, in the case where the control unit 420 determines to directly encode the intra-prediction mode not by using the prediction encoding but by using another method, the "pred_mode_coding_method" flag is set as 1.

When the "pred_mode_coding_method" flag is 0, the intra-prediction mode is predictably encoded. Since this is the same as the conventional method of encoding the intra-prediction mode, a detailed description thereof will be omitted here.

When the "pred_mode_coding_method" flag is 1, the intra-prediction mode is directly encoded not by using the prediction encoding but by using another method. "intra4×4_pred_mode[n]" and "intra8×8_pred_mode[n]" are syntax for directly encoding the intra-prediction mode, according to the present invention.

The syntax shown in FIGS. 6A and 6B is an example of syntax for setting the flag indicating the prediction encoding and for selectively, predictably encoding the encoding information. Thus, it will be easily understood by those of ordinary skill in the art that it is possible to indicate the flag and the selective prediction encoding by using another syntax, except for the syntax of FIGS. 6A and 6B.

Referring back to FIG. 4, the information encoding unit 440 selectively performs the prediction encoding according to the determination by the control unit 420, and encodes the encoding information for each of the sub-blocks 502 through 532.

For example, when the control unit 420 determines that the intra-prediction mode is predictably encoded, the information encoding unit 440 predictably encodes the intra-prediction mode according to the conventional method of predictably encoding the intra-prediction mode, which is described with relation to FIGS. 3A and 3B. In other words, the intra-prediction mode of the current block is predicted from the adjacent blocks which are respectively adjacent to the sub-blocks 502 through 532, and the encoding information is predictably encoded based on the prediction.

Conversely, when the control unit 420 decides that the intra-prediction mode is encoded not by using the prediction encoding but by using another method, the information encoding unit 440 does not perform the prediction encoding but directly encodes the intra-prediction mode.

To be more specific with reference to the syntax of FIG. 6B, when the "pred_mode_coding_method" flag is 0, the intra-prediction mode of a block having a 4×4-size or an 8×8-size is predictably encoded according to the conventional method. However, when the "pred_mode_coding_method" flag is 1, the intra-prediction mode is directly encoded not by using the prediction encoding but by using another method. A method of directly encoding the intra-prediction mode will now be described in detail with reference to FIG. 7.

Figure 7:
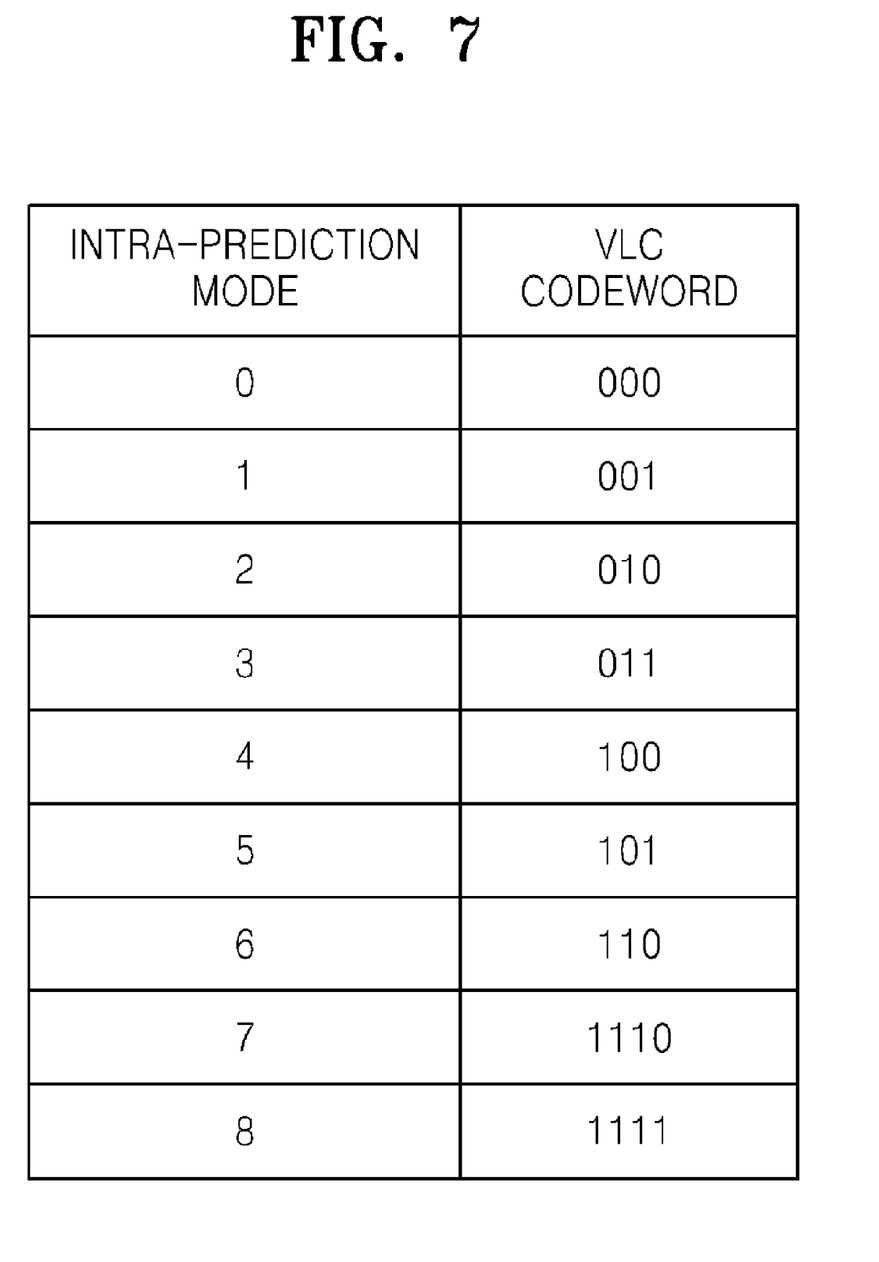
FIG. 7 illustrates a look-up table with reference to variable length coding of an intra-prediction mode according to another exemplary embodiment of the present invention.

FIG. 7 illustrates a look-up table with reference to variable length coding of an intra-prediction mode according to another embodiment of the present invention.

The look-up table of FIG. 7 corresponds to the case in which intra-prediction modes of sub-blocks having a 4×4-size or an 8×8-size are encoded. Referring to FIG. 7, in the case where numbers of the intra-prediction modes are 0 through 6, the intra-prediction modes may be directly encoded by using three bits. In the case where the numbers of the intra-prediction modes are 7 or 8, the intra-prediction modes may be directly encoded by using four bits.

In the case where an intra-prediction mode is predictably encoded according to the conventional method of FIGS. 3A and 3B, when the number of times that a predicted intra-prediction mode is equal to an actual intra-prediction mode by which each of the sub-blocks having the 4×4-size is predictably encoded, is 0, a total of 4×16=64 bits are required to encode the intra-prediction mode of each of the sub-blocks having the 4×4-size included in a macroblock. However, when the intra-prediction modes are encoded according to the variable length coding of FIG. 7, 3×16=48 bits are required when all of the numbers of the intra-prediction modes are 0 through 6, and 4×16=64 bits are required when all of the numbers of the intra-prediction modes are 7 or 8. The more the number of the intra-prediction mode is frequently used in the intra-prediction, the smaller the number is. Thus, it is unusual that all of the numbers of the intra-prediction modes are 7 or 8. Also, it is highly unusual that all numbers of intra-prediction modes of sub-blocks included in a macroblock are 7 or 8, and thus, the intra-prediction mode may be efficiently encoded, compared to the case in which the intra-prediction modes of the sub-blocks are unconditionally and predictably encoded.

Except for the current embodiment of FIG. 7, the intra-prediction mode may be encoded by using another variable length coding method. For example, the intra-prediction mode may be encoded by using an exponential-Golomb code or context-adaptive variable length coding (CAVLC).

In addition, the intra-prediction mode may be encoded not by using the variable length coding of FIG. 7 but by using context-adaptive variable arithmetic coding (CABAC).

Referring back to FIG. 4, the bitstream generation unit 450 receives data about the pixel values of the current block, and additional information data, and generates the bitstream for the current block. The data about the pixel values of the current block is the data generated by the pixel value encoding unit 410. The additional information includes information about the encoding method by which the information encoding unit 440 encodes the pixel value of each of the sub-blocks 502 through 532 included in the encoded current block, and includes flag information indicating whether information about the encoding method, which is encoded by the flag encoding unit 430, is predictably encoded.

The control unit 420, the flag encoding unit 430, and the information encoding unit 440 are described above with reference to the case in which the intra-prediction mode is encoded. However, it has been previously described that the method of encoding the encoding information according to the present invention may be used to encode all encoding information for performing the prediction encoding.

For example, the method of encoding the encoding information according to the present invention may be used to encode encoding information for inter-prediction encoding which performs inter-prediction by a plurality of reference pictures. The method of encoding the encoding information according to the present invention may be used to encode a reference picture index, that is, information about reference pictures respectively referred by each block included in a current block. In other words, it may be possible to determine whether the reference picture index with respect to each block has been exactly predicted, and to calculate an exactly predicted number of times to determine whether or not to predictably encode the reference picture index.

Also, the method of encoding the encoding information according to the present invention may be applied to encoding a prediction mode of a frequency domain coefficient of a residual block. In order to encode information about the prediction mode of a DC component or an alternating current (AC) component of discrete cosine coefficients, the number of times that the prediction mode of the DC or AC components is exactly predicted, may be calculated, and based on the calculated number of times, the prediction mode may be determined whether or not to be predictably encoded.

Figure 8:
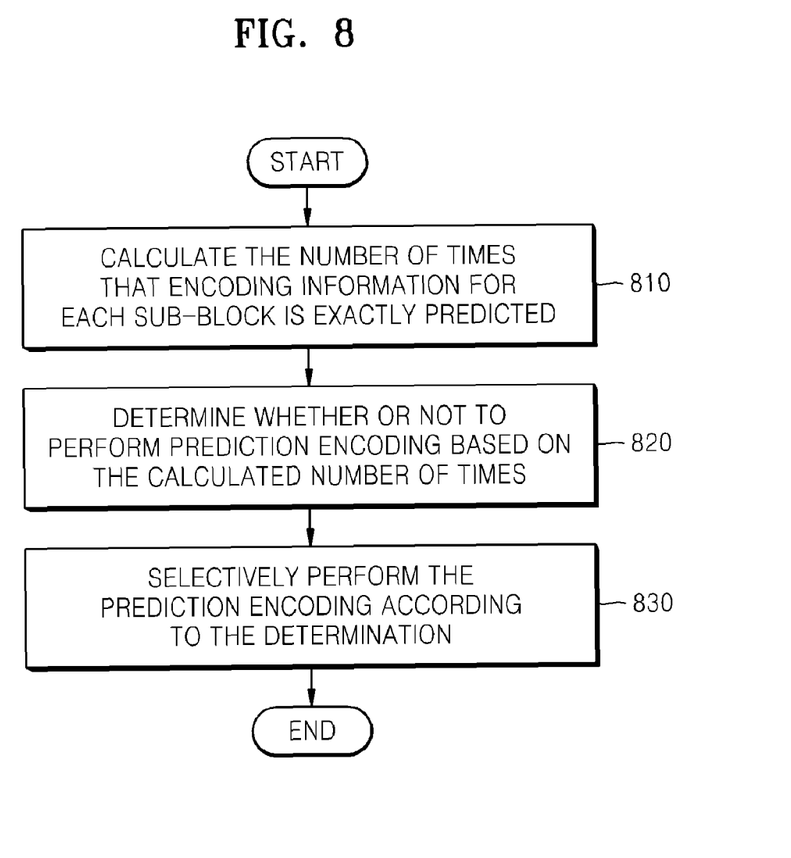
FIG. 8 is a flowchart illustrating a method of encoding an image, according to an exemplary embodiment of the present invention.

FIG. 8 is a flowchart illustrating a method of encoding an image using the image encoding apparatus 400 of FIG. 4, according to an embodiment of the present invention.

In operation 810, the image encoding apparatus 400 calculates the number of times that encoding information for each of a plurality of sub-blocks included in a current block is exactly predicted. The encoding information relates to an encoding method used to encode a pixel value of each sub-block. The current block may be a macroblock, and in this case, each sub-block may be a block having a 4×4-size or an 8×8 size.

To be more specific with reference to an intra-prediction mode, a number of times corresponding to a number of times that the intra-prediction mode is used to predictably encode each sub-block equal to an intra-prediction mode that is predicted from intra-prediction modes of blocks respectively adjacent to each sub-block is calculated. It has previously been described that the method of encoding the image according to the present invention may be applied to encoding the prediction mode of the reference picture index or the prediction mode of the discrete cosine coefficient.

In operation 820, based on the number of times calculated in operation 810, the image encoding apparatus 400 determines whether or not to predictably encode the encoding information of each sub-block. In the case where the predicted encoding information and information about the encoding method, which is actually used to encode each sub-block, are equal to each other greater than a predetermined number of times, the encoding information of each sub-block is determined to be predictably encoded. Otherwise, when the predicted encoding information and the information about the encoding method are equal to each other less than or the same as the predetermined number of times, the encoding information of each sub-block is determined not to be predictably encoded but to be directly encoded by using another method.

In operation 830, according to the determination in operation 820, the image encoding apparatus 400 selectively performs prediction encoding and encodes the encoding information of each sub-block.

To be more specific with reference to encoding the intra-prediction mode, the intra-prediction mode of each sub-block included in the current block is predictably encoded only when the number of times is determined to be greater than the predetermined number in operation 820, wherein the number of times is a number of times that the intra-prediction mode actually used to encode each sub-block is equal to the intra-prediction mode predicted from the blocks which are respectively adjacent to each sub-block. In the case where the number of times is determined to be less than or the same as the predetermined number in operation 820, the intra-prediction mode is not predictably encoded but directly encoded in order to reduce the number of bits required to encode the intra-prediction mode. The method of directly encoding the intra-prediction mode has been previously described with reference to FIG. 7.

Figure 9:
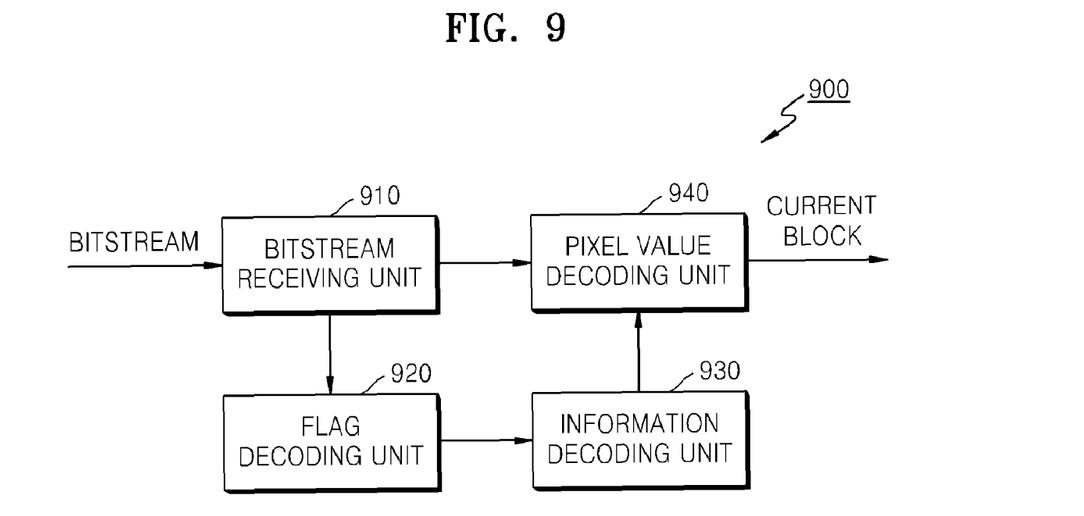
FIG. 9 is a block diagram of an apparatus for decoding an image, according to an exemplary embodiment of the present invention.

FIG. 9 is a block diagram of an apparatus for decoding an image, according to an embodiment of the present invention.

Referring to FIG. 9, the apparatus for decoding the image (hereinafter, referred to as 'an image decoding apparatus 900') according to the current embodiment of the present invention includes a bitstream receiving unit 910, a flag decoding unit 920, an information decoding unit 930, and a pixel value decoding unit 940.

The bitstream receiving unit 910 receives a bitstream including data about a current block, and parses the received data, thereby extracting data about pixel values of the current block, and additional information data. The additional information data includes information about an encoding method used in order to encode a pixel value of each of a plurality of sub-blocks included in the current block, and includes flag information indicating whether information about the encoding method is predictably encoded.

The flag decoding unit 920 decodes the flag information included in the additional information data extracted by the bitstream receiving unit 910. The flag information may be configured so as to indicate that encoding information, i.e., the information about the encoding method with respect to each sub-block included in the current block, is predictably encoded when the flag is set as 0, or to indicate that the encoding information is directly encoded not by using prediction encoding but by using another method when the flag is set as 1.

Based on the flag information decoded by the flag decoding unit 920, the information decoding unit 930 decodes the encoding information of each sub-block included in the current block. This will now be described with reference to the case in which an intra-prediction mode of each sub-block as illustrated in FIG. 5 is decoded.

When the flag indicating the prediction encoding is set as 0, prediction decoding is performed so that the encoding information of each sub-block is decoded. First, it is determined whether the intra-prediction mode actually used for the intra-prediction of the sub-block 502 is equal to the intra-prediction modes predicted from the adjacent blocks 542 and 552. At this time, the determination is performed by referring to "prev_ intranXn_pred_mode_flag[n]" of the sub-block 502 in the syntax of FIG. 6B, that is, a flag indicating whether the prediction is exact.

When "prev_intranXn_pred_mode_flag[n]" of the sub-block 502 is 1, the predicted intra-prediction mode is to be used as an actual intra-prediction mode. Conversely, when "prev_intranXn_pred_mode_flag[n]" of the sub-block 502 is 0, information about the intra-prediction mode encoded by using three bits, excluding the flag, is decoded. When "rem_intranXn_pred_mode[n]" of the sub-block 502 is smaller than a number of the intra-prediction mode predicted from the adjacent blocks 542 and 552, "rem_intranXn_pred_mode[n]" becomes a number of the intra-prediction mode of the sub-block 502. Conversely, when "rem_intranXn_pred_mode[n]" of the sub-block 502 is greater than the number of the intra-prediction mode predicted from the adjacent blocks 542 and 552, "rem_intranXn_pred_mode[n]+1" becomes the number of the intra-prediction mode of the sub-block 502. The method of predictably decoding the intra-prediction mode as described above is the same as a prediction decoding method according to the H.264 standard.

When the flag indicating the prediction encoding is set as 1, the information decoding unit 930 does not perform the prediction decoding but directly decodes the encoding information.

To be more specific with reference to the syntax of FIG. 6B, the intra-prediction mode is decoded by directly decoding "intranXn_pred_mode[n]". Based on the look-up table of the variable length coding in FIG. 7, the intra-prediction mode may be directly decoded. In the case where the exponential-Golomb code, the CAVLC or the CABAC is used so as to directly encode the encoding information, the encoding information is decoded by using decoding methods, each of which corresponds to the exponential-Golomb code, the CAVLC or the CABAC.

The pixel value decoding unit 940 decodes the pixel value of each sub-block included in the current block, based on the encoding information decoded by the information decoding unit 930. The pixel value decoding unit 940 performs an entropy decoding and an inverse-quantization on information about the pixel values of the current block extracted by the bitstream receiving unit 910, reconstructs DCT coefficients, performs an inverse DCT on the reconstructed DCT coefficients, and reconstructs a residual block of the current block.

After that, each sub-block included in the current block is predicted based on the encoding information decoded by the information decoding unit 930, and a prediction block of the current block is generated according to the prediction. The residual block is added to the generated prediction block so that the current block is reconstructed.

The method of decoding the encoding information by the image decoding apparatus 900 has been described with reference to the intra-prediction mode. However, it will be easily understood by those of ordinary skill in the art that the method of decoding the encoding information according to the present invention may be used to decode not only the intra-prediction mode but also to decode a reference picture index of inter-prediction, or a prediction mode of a cosine coefficient.

Figure 10:
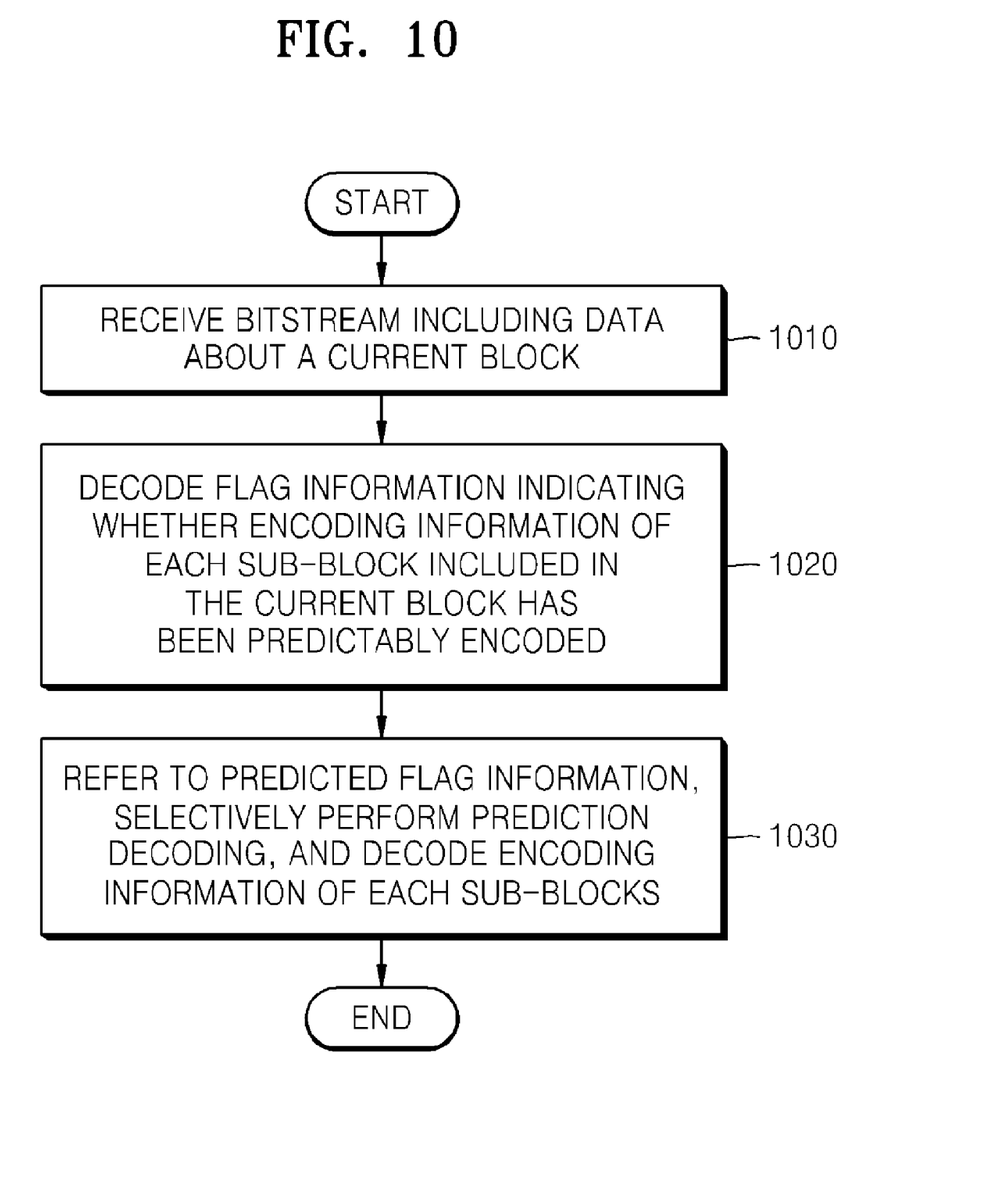
FIG. 10 is a flowchart illustrating a method of decoding an image, according to an exemplary embodiment of the present invention.

FIG. 10 is a flowchart illustrating a method of decoding an image using the image decoding apparatus 900 of FIG. 9, according to an embodiment of the present invention.

Referring to FIG. 10, in operation 1010, the image decoding apparatus 900 receives a bitstream including data about a current block. The data about the current block includes data about pixel values of the current block, and additional information data. The additional information data includes encoding information constituting information about an encoding method with respect to each of a plurality of sub-blocks included in the current block, and includes flag information indicating whether the encoding information is predictably encoded.

In operation 1020, the image decoding apparatus 900 parses the received bitstream, thereby decoding the flag information indicating whether the encoding information is predictably encoded.

In operation 1030, the image decoding apparatus 900 refers to the flag information decoded in operation 1020, selectively performs prediction decoding, and decodes the encoding information of each sub-block.

When the flag information indicates that the encoding information has been predictably encoded, the prediction decoding is performed to decode the encoding information. When the flag information indicates that the encoding information has been encoded not by using the prediction encoding but by using another method, the encoding information is decoded by using a decoding method corresponding to the other method. A detailed description thereof has been previously described with reference to the information decoding unit 930 of FIG. 9.

According to the present invention, in order to encode information about the encoding method used to encode pixel values of each sub-block included in a current block, not only prediction encoding but also other encoding modes may be used. Accordingly, the number of bits required to encode the information about the encoding method related to the pixel values can be reduced.

The present invention can also be embodied as computer-readable codes on a computer-readable recording medium or a computer readable transmission medium. The computer-readable recording medium is any data storage device that can store data, which can be thereafter read by a computer system. Examples of the computer-readable recording medium include read-only memory (ROM), random-access memory (RAM), CD-ROMs, magnetic tapes, floppy disks, and optical data storage devices. An example of the computer readable transmission medium is carrier waves (such as data transmission through the Internet). The computer-readable recording medium can also be distributed over network-coupled computer systems so that the computer-readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of encoding an image, the method comprising:
calculating a number of times that encoding information of each of a plurality of sub-blocks included in a current block is exactly predicted;
determining whether or not to predictably encode the encoding information of each of the sub-blocks, based on the calculated number of times; and
selectively performing prediction encoding according to the determination, and encoding the encoding information of each of the sub-blocks,
wherein the encoding information relates to an encoding method used to encode a pixel value of each of the sub-blocks.

2. The method of claim 1, wherein the encoding information is related to an intra-prediction mode.

3. The method of claim 2, wherein; when the calculated number of times is greater than a predetermined number, the performing of the prediction encoding comprises predictably encoding the intra-prediction mode of each of the sub-blocks, based on intra-prediction modes of adjacent blocks that are respectively adjacent to each of the sub-blocks.

4. The method of claim 2, wherein, when the calculated number of times is less than or equal to a predetermined number, the performing of the prediction encoding comprises not predictably encoding the intra-prediction mode of each of the sub-blocks but directly encoding the intra-prediction mode of each of the sub-blocks according to variable length coding.

5. The method of claim 2, wherein, when the calculated number of times is less than or equal to a predetermined number, the performing of the prediction encoding comprises not predictably encoding the intra-prediction mode of each of the sub-blocks but directly encoding the intra-prediction mode of each of the sub-blocks according to CABAC (context-adaptive variable arithmetic coding).

6. The method of claim 2, wherein the current block is a macroblock and each of the sub-blocks is a block having a 4×4-size or an 8×8-size.

7. The method of claim 1, further comprising encoding flag information for differentiating one case, in which the encoding information of each of the sub-blocks is predictably encoded, from another case in which the encoding information is not predictably encoded.

8. The method of claim 1, wherein the encoding information is a prediction mode of one of a reference picture index and a discrete cosine coefficient.

9. A method of decoding an image, the method comprising:
receiving a bitstream comprising data relating to a current block, extracting flag information from the received bitstream, and decoding the flag information indicating whether encoding information of each of a plurality of sub-blocks included in the current block is predictably encoded; and
referring to the extracted flag information, selectively performing prediction decoding, and decoding the encoding information of each of the sub-blocks,
wherein the encoding information relates to an encoding method used to encode a pixel value of each of the sub-blocks,
wherein the flag information is obtained based on the number of times that the encoding information of each of a plurality of sub-blocks included in the current block is exactly predicted.

10. The method of claim 9, wherein the encoding information relates to an intra-prediction mode.

11. The method of claim 10, wherein the decoding of the encoding information comprises:
referring to the flag information, and determining whether an intra-prediction mode of each of the sub-blocks has been predictably encoded; and
selectively performing the prediction decoding according to the determination, and decoding the intra-prediction mode of each of the sub-blocks.

12. The method of claim 11, wherein the decoding of the intra-prediction mode comprises predictably decoding the intra-prediction mode of each of the sub-blocks based on intra-prediction modes of adjacent blocks which are respectively adjacent to each of the sub-blocks when the intra-prediction mode of each of the sub-blocks has been predictably encoded.

13. The method of claim 11, wherein the decoding of the intra-prediction mode comprises directly decoding the intra-prediction mode of each of the sub-blocks which has been encoded to the bitstream according to variable length coding or Context-based Adaptive Binary Arithmedic Code (CABAC) when the intra-prediction mode of each of the sub-blocks has not been predictably encoded.

14. The method of claim 9, wherein the current block is a macroblock and each of the sub-blocks is a block having a 4×4-size or an 8×8-size.

15. The method of claim 9, wherein the encoding information is a prediction mode of one of a reference picture index and a discrete cosine coefficient.

16. An image encoding apparatus, the image encoding apparatus comprising:
a control unit which calculates a number of times that encoding information of each of a plurality of sub-blocks included in a current block is exactly predicted, and determines whether or not to predictably encode the encoding information of each of the sub-blocks, based on the calculated number of times; and
an information encoding unit which selectively performs prediction encoding according to the determination, and encoding the encoding information of each of the sub-blocks,
wherein the encoding information relates to an encoding method used to encode a pixel value of each of the sub-blocks.

17. The image encoding apparatus of claim 16, wherein the encoding information relates to an intra-prediction mode.

18. The image encoding apparatus of claim 17, wherein, when the calculated number of times is greater than a predetermined number, the information encoding unit predictably encodes the intra-prediction mode of each of the sub-blocks, based on intra-prediction modes of adjacent blocks which are respectively adjacent to each of the sub-blocks.

19. The image encoding apparatus of claim 17, wherein, when the calculated number of times is less than or equal to a predetermined number, the information encoding unit does not predictably encode the intra-prediction mode of each of the sub-blocks but directly encodes the intra-prediction mode of each of the sub-blocks according to variable length coding.

20. The image encoding apparatus of claim 17, wherein, when the calculated number is less than or equal to a predetermined number, the information encoding unit does not predictably encode the intra-prediction mode of each of the sub-blocks but directly encodes the intra-prediction mode of each of the sub-blocks according to CABAC.

21. The image encoding apparatus of claim 16, wherein the encoding information relates to a prediction mode of one of a reference picture index and a discrete cosine coefficient.

22. An image decoding apparatus, the image decoding apparatus comprising:
- a flag decoding unit which receives a bitstream comprising data relating to a current block, extracts flag information from the received bitstream, and decodes the flag information indicating whether encoding information of each of a plurality of sub-blocks included in the current block is predictably encoded; and
- an information decoding unit which refers to the extracted flag information, selectively performs prediction decoding, and decodes the encoding information of each of the sub-blocks, wherein the encoding information relates to an encoding method used to encode a pixel value of each of the sub-blocks, wherein the flag information is obtained based on the number of times that the encoding information of each of a plurality of sub-blocks included in the current block is exactly predicted.

23. The image decoding apparatus of claim 22, wherein the encoding information comprises information relating to an intra-prediction mode.

24. The image decoding apparatus of claim 23, wherein the information decoding unit refers to the flag information, determines whether an intra-prediction mode of each of the sub-blocks has been predictably encoded, selectively performs the prediction decoding according to the determination, and decodes the intra-prediction mode of each of the sub-blocks.

25. The image decoding apparatus of claim 24, wherein the information decoding unit predictably decodes the intra-prediction mode of each of the sub-blocks based on intra-prediction modes of adjacent blocks which are respectively adjacent to each of the sub-blocks when the intra-prediction mode of each of the sub-blocks has been predictably encoded.

26. The image decoding apparatus of claim 24, wherein the information decoding unit directly decodes the intra-prediction mode of each of the sub-blocks which has been encoded to the bitstream according to variable length coding or CABAC when the intra-prediction mode of each of the sub-blocks has not been predictably encoded.

27. The image decoding apparatus of claim 22, wherein the encoding information comprises information relating to a prediction mode of one of a reference picture index and a discrete cosine coefficient.

28. A computer readable recording medium having recorded thereon a program when executed causes a computer to perform the method of claim 1.

29. A computer readable recording medium having recorded thereon a program when executed causes a computer to perform the method of claim 9.

* * * * *